US008056770B2

(12) United States Patent
Lompech et al.

(10) Patent No.: US 8,056,770 B2
(45) Date of Patent: Nov. 15, 2011

(54) COMPACT PUMP WITH THE CAPACITY TO SWIVEL THE ATOMIZER RELATIVE TO THE PLUNGER

(75) Inventors: Herve Lompech, Ansennes Bouttencourt (FR); Richard Thomas Abucewicz, Plantsville, CT (US); Roger Pappineau, Thomaston, CT (US); Jean-Luc Marcel Octau, Intraville (FR); Pierre Gabriel Dumont, Monchy-sur-EU (FR)

(73) Assignee: Rexam Dispensing Systems S.A.S. (FR)

( * ) Notice: Subject to any disclaimer, the term of this patent is extended or adjusted under 35 U.S.C. 154(b) by 369 days.

(21) Appl. No.: 11/962,952

(22) Filed: Dec. 21, 2007

(65) Prior Publication Data

US 2008/0164344 A1 Jul. 10, 2008

(30) Foreign Application Priority Data

Dec. 22, 2006 (FR) .................................... 06 11327

(51) Int. Cl.

| | |
|---|---|
| ***B65D 88/54*** | (2006.01) |
| ***G01F 11/00*** | (2006.01) |
| ***A62C 11/00*** | (2006.01) |
| ***B05B 9/043*** | (2006.01) |
| ***B05B 1/32*** | (2006.01) |

(52) U.S. Cl. ............... 222/321.2; 222/321.1; 222/321.7; 222/321.8; 239/333; 239/541

(58) Field of Classification Search ................. 239/333, 239/541, 600; 222/207, 309, 321.1, 321.2, 222/321.7, 321.8, 321.9, 341, 402.1
See application file for complete search history.

(56) References Cited

U.S. PATENT DOCUMENTS

| | | | | |
|---|---|---|---|---|
| 4,228,931 | A * | 10/1980 | Ruscitti et al. ............ | 222/321.2 |
| 5,697,530 | A * | 12/1997 | Montaner et al. .......... | 222/321.2 |
| 6,196,424 | B1 * | 3/2001 | Bougamont et al. ....... | 222/321.9 |
| 2005/0023302 | A1 * | 2/2005 | Cater ......................... | 222/402.1 |
| 2006/0151541 | A1 * | 7/2006 | Pares Montaner et al. .......................... | 222/321.2 |

FOREIGN PATENT DOCUMENTS

| | | |
|---|---|---|
| EP | 0 301 615 A2 | 2/1989 |
| FR | 2 719 789 A1 | 11/1995 |
| FR | 2 764 005 A1 | 12/1998 |

OTHER PUBLICATIONS

French Search Report, Aug. 8, 2007, 2 Pages.
French Opinion, Aug. 8, 2007, 4 pages.

* cited by examiner

*Primary Examiner* — Jason J Boeckmann
*Assistant Examiner* — Ryan Reis
(74) *Attorney, Agent, or Firm* — St. Onge Steward Johnston & Reens LLC

(57) ABSTRACT

The invention relates to a pump intended to be mounted on a bottle so as to enable a liquid contained in said bottle to be dispensed, said pump including a pump body, an atomizer secured to a push button, a means for the elastic return of the translatory motion of said atomizer in said body, and a plunger mounted in frictional contact against the internal surface of said body so as to define a dosing chamber which is in communication with the liquid by means of a clack valve, wherein the plunger is mounted coaxially around the atomizer in an association zone, said association zone being arranged so as to enable sealed swiveling between the plunger and the atomizer.

14 Claims, 3 Drawing Sheets

COMPACT PUMP WITH THE CAPACITY TO SWIVEL THE ATOMIZER RELATIVE TO THE PLUNGER

CROSS-REFERENCE TO RELATED APPLICATIONS

The present application claims priority of French patent application No. 06 011327 filed on Dec. 22, 2006, the content of which is incorporated herein by reference.

FIELD OF THE INVENTION

The invention relates to a pump intended to be mounted on a bottle so as to enable a liquid contained in said bottle to be dispensed, said liquid possibly being a perfume, a cosmetic product or a pharmaceutical product.

BACKGROUND OF THE INVENTION

Such pumps are known that typically include an atomizer which is activated in translatory motion in a body via a push button in a fluid dispensing and suction stroke respectively. Furthermore, to enable the liquid to be pressurised, a plunger is mounted on the atomizer so as to offer, depending on said pressure, a state where a dispensing path is blocked and a state where it is open.

To enable the system to be switched reversibly into these two states, two implementations are known from the prior art:

attaching the plunger to the atomizer, with switching from one state to the other being implemented by elastic deformation of said plunger;

mounting the plunger to slide on the atomizer and elastically constraining the movement of the one relative to the other, with switching from one state to the other then being dependent on the resultant of the constraints exerted by the constraint means and by the pressure respectively on the liquid.

In known embodiments, the plunger and the atomizer are mounted coaxially in a rigid way, typically by providing a contact zone of significant axial dimension, so as to guarantee coaxial movement of the atomizer-plunger assembly. However, these embodiments have the drawback of taking up space, which may prove restrictive when it comes to the implementation of pumps of reduced axial dimension.

Furthermore, the atomizer-plunger assembly is held coaxially in the body via a sealed support on two zones spaced apart axially, formed between the atomizer and a member secured to the body, and between the plunger and the inside of the body respectively. Consequently, the reliability of this holding arrangement and therefore of the tightness are conditioned by the spacing between the support zones, in other words by the axial dimension of the pump.

SUMMARY OF THE INVENTION

The invention aims in particular to overcome the limitations mentioned above, so as to enable a pump of reduced axial dimension to be implemented.

To this end, the invention proposes a pump intended to be mounted on a bottle so as to enable a liquid contained in said bottle to be dispensed, said pump including:

a pump body intended to be rigidly connected to the bottle while able to be brought into communication with the liquid;

an atomizer secured to a push button so as to be activated in translatory motion in said body, said atomizer including a dispensing path including at least one upstream orifice and a channel whereof the downstream end is in communication with a dispensing nozzle;

a means for the elastic return of the translatory motion of said atomizer in said body;

a plunger mounted in frictional contact against the internal surface of said body so as to define a dosing chamber which is in communication with the liquid by means of a clack valve, said plunger being arranged so as to offer a state where the upstream orifices are blocked and a state where said upstream orifices are brought into communication with the dosing chamber;

wherein the plunger is mounted coaxially around the atomizer in an association zone, said association zone being arranged so as to enable sealed swiveling between the plunger and the atomizer.

BRIEF DESCRIPTION OF THE DRAWINGS

Other objects and advantages of the invention will emerge from the following description, given in reference to the appended figures, wherein.

DETAILED DESCRIPTION OF THE INVENTION

Figure 1A:
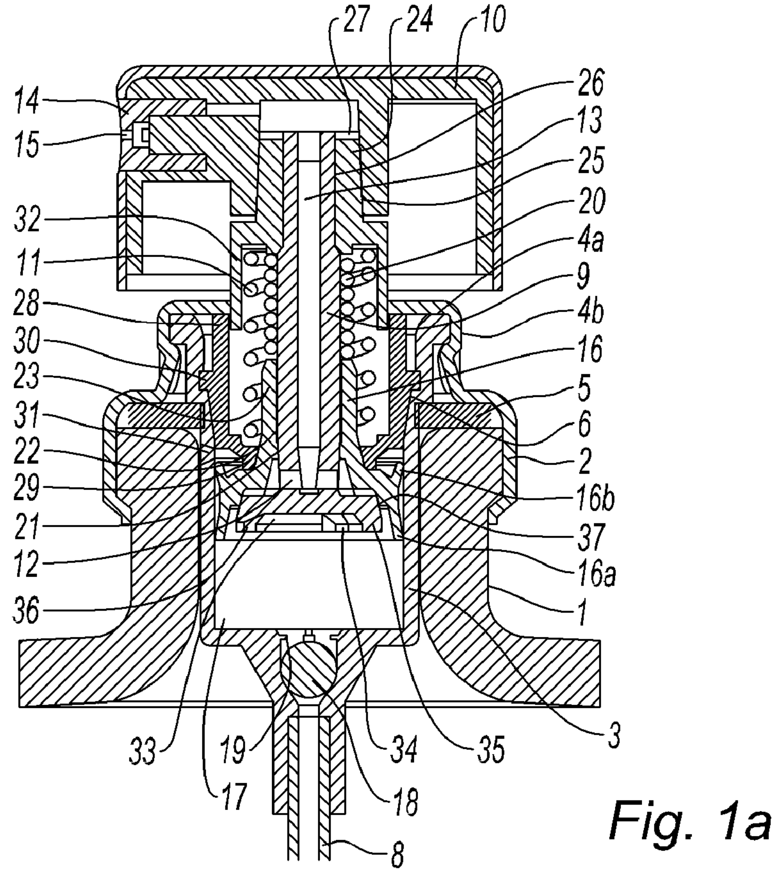
FIGS. 1*a* to 1*d* are views in longitudinal cross-section of a pump according to one embodiment of the invention, said pump being mounted on the collar of a bottle by means of a cap, said pump being shown respectively in the rest position (1*a*), in its dispensing stroke (1*b*), in its end of stroke setting (1*c*) and in its suction stroke (1*d*)

In the description, the spatial positioning terms are taken with reference to the position of the pump shown in the figures.

With reference to the figures, a pump is described below that is intended to be mounted on a bottle so as to enable a liquid contained in said bottle to be dispensed. As an application example, the liquid is a perfume, a cosmetic product or a pharmaceutical product.

In the figures, the pump is mounted on the collar 1 of a bottle (not shown) by means of a cap 2, made particularly of aluminium, which is deformed so as to conform in shape to the forms of the association zone in order to lock the pump axially and radially relative to the bottle. In other embodiments, the cap 2 may include a geometry and/or configurations of association means on the collar 1 of the bottle which are different.

The pump also includes a pump body 3 on which the cap 2 is mounted, said body being of cylindro-conical geometry which is defined by an inner surface. To be more precise, the body 3 includes an upper zone 4 which is intended to enable the pump to be mounted onto the bottle, said zone including an upper sealing bead 4*a* and a lateral sealing bead 4*b*. The cap 2 is thus folded back over the zone 4 to enable a radial bearing surface and a lateral bearing surface of the cap 2 to be supported in a sealed way on one sealing bead 4*a*, 4*b* respectively. As a variant is not shown, a single type of beads 4*a*, 4*b* may be provided to provide the seal between the cap 2 and the pump body 3.

Furthermore, an internal coupling 5 is provided between the body 3 and the cap 2. The coupling 5 is held supported on the upper surface of the collar 1 by the cap 2 and a sealing groove 6 is provided on the periphery of the body 3 to accommodate in a sealed way the internal end of said coupling. In the embodiment shown, the periphery of the body 3 also has, under the groove 6, a bead 7 which on one hand enables the coupling 5 to be retained axially before the pump is mounted onto the collar 1, and on the other hand enables a seal to be formed between the inside of the collar 1 and the body 3. To do this, the internal diameter of the bead 7 is smaller than that of the bore of the coupling 5 and about the same as the internal diameter of the collar 1.

The pump includes a dip tube 8 whereof the upper part is fitted into the lower part of the body 3 and whereof the lower part is immersed in the liquid contained in the bottle.

Figure 1B:
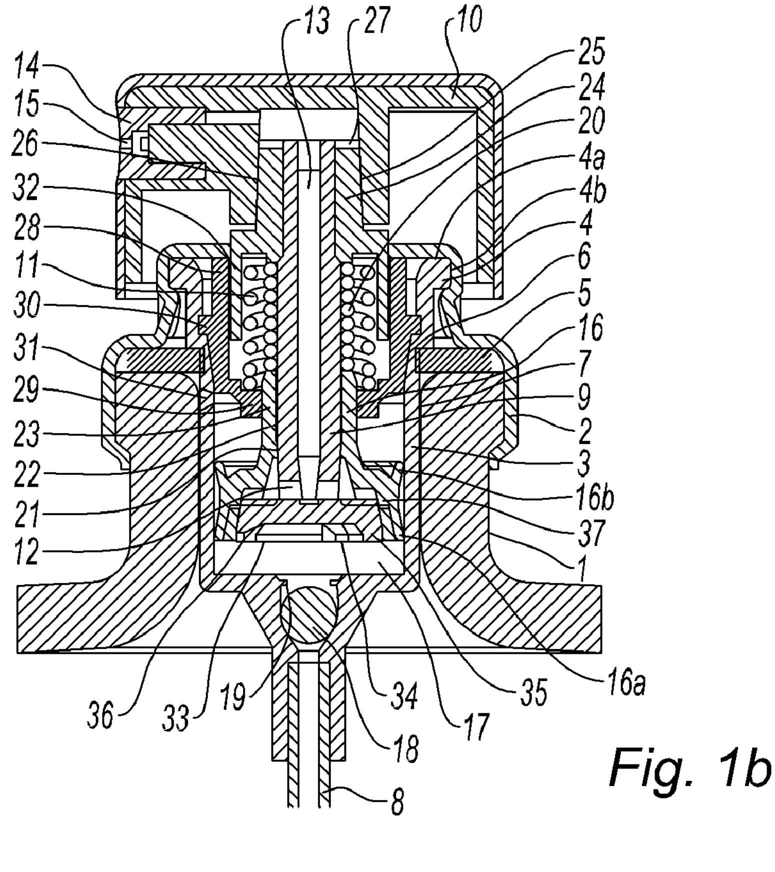

Furthermore, the pump includes an atomizer 9 which is placed in the body 3. The atomizer 9 is secured to a push button 10 which can be activated in translatory motion by the user so as to move said atomizer in said body in a liquid dispensing stroke (FIG. 1*b*) and a liquid suction stroke (FIG. 1*d*) respectively. Furthermore, a means for the elastic return 11 of the translatory motion of the atomizer 9 in the body 3 is provided.

The atomizer 9 includes a substantially vertical dispensing path which is formed of two radial upstream orifices 12 and a channel 13 in communication with said orifices. Furthermore, the downstream end of the channel 13 is inserted into the push button 10 so as to be in communication with a dispensing nozzle 14 by means of a path provided in said button, said nozzle being built into the push button 10 so as to be able to dispense the liquid through a dispensing orifice 15.

The pump also includes a plunger 16 which is mounted in frictional contact against the internal surface of the body 3. The plunger 16 defines a dosing chamber 17 which is in communication with the dip tube 8 by means of a clack valve formed by a ball 18 placed on a seat provided in the bottom of the body 3. The seat is provided with lugs 19 to hold down the ball 18 thereby forming a retaining cage thereof at the bottom of the dosing chamber 17.

The plunger 16 is mounted coaxially around the atomizer 9 in an association zone so as to be able to offer a state where the upstream orifices 12 are blocked and a state where said upstream orifices are brought into communication with the dosing chamber 17.

In the embodiment shown, the association zone is arranged so as to enable a relative sliding of the plunger 16 around the atomizer 9 between the state where it is blocked and the state where it is brought into communication. Furthermore, the sliding is constrained by elastic pre-tensioning means 20 mounted in support between the plunger 16 and the atomizer 9. Alternatively and not shown, the plunger 16 may be switched between its two states by deforming it as a function of the pressure applied.

Figure 1C:
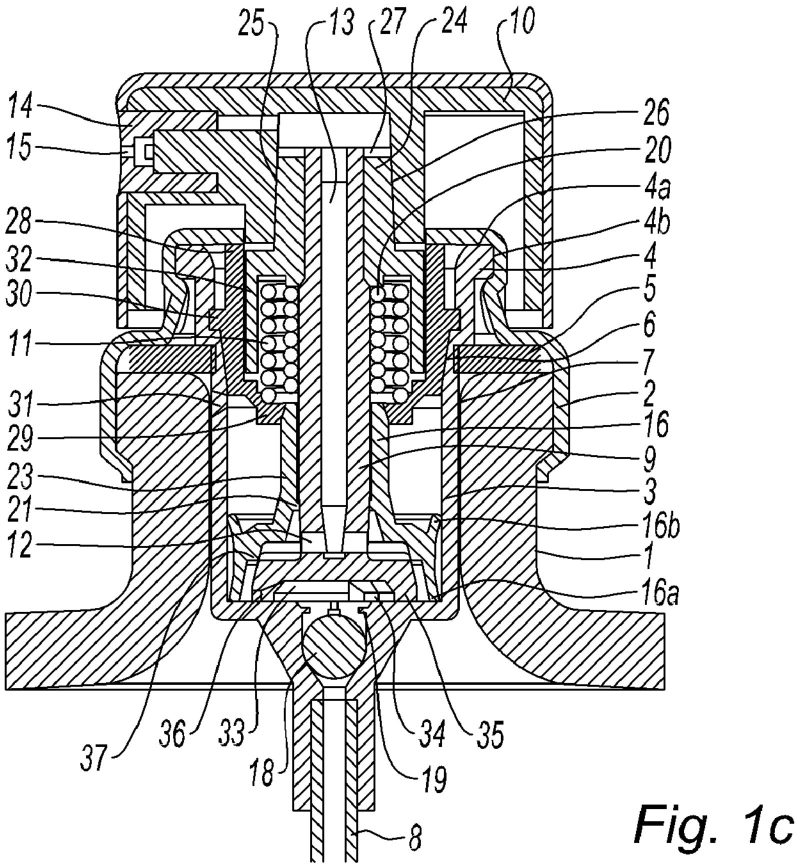
Figure 1D:
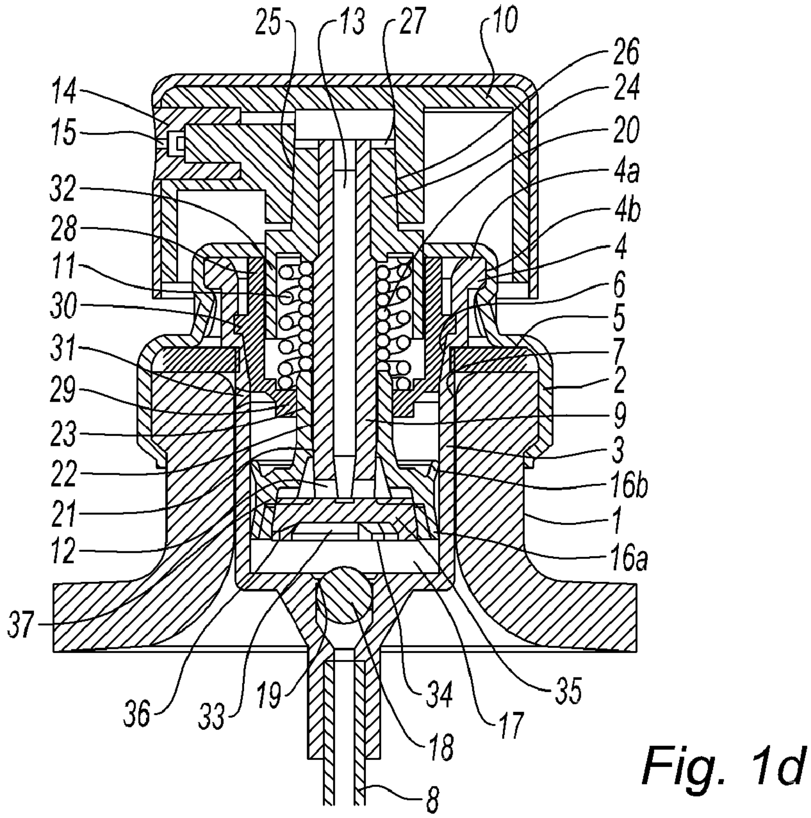

In this way, in its state of rest (FIG. 1*a*), the plunger 16 is in its blocked state and pressing on the push button 10 pressurises the liquid contained in the dosing chamber 17 such that, in compensation for the stress exerted by the pre-tensioning means 20, the plunger 16 is switched into its dispensing state (FIG. 1*b*), as far as its end of stroke setting (FIG. 1*c*). Then, by releasing the pressure on the push button 10, the return means 11 moves the atomizer 9 into its suction stroke (FIG. 1*c*) wherein the plunger 16 is in its blocked state and the ball 18 is raised to enable the dosing chamber 17 to be supplied with liquid.

To seal the dosing chamber 17, the plunger 16 includes a lower sealing lip 16*a* which is in frictional contact on the internal surface of the body 3. The lip 16*a* is annular and extends in the direction of the dosing chamber 17 moving away from the axis of the plunger 16. The plunger 16 additionally includes an upper sealing lip 16*b* which is in frictional contact on the internal surface of the body 3, said upper lip extending on the opposite side from the lower lip 16*a* relative to the direction of translatory motion of the plunger 16.

To compensate for any misalignments between the axis of the thrust exerted on the push button 10 and the axis of the body 3, the association zone is arranged so as to enable sealed swiveling between the plunger 10 and the atomizer 9. In this way, in the event of off-centre pressure being applied to the push button 10, misalignment of the atomizer 9 relative to the body 3 is compensated by swiveling in order to keep the plunger 16 in the axis, so as in particular to maintain the seal of the dosing chamber 17. In particular, swiveling enables the sealing lips 16*a*, 16*b* to be held in contact on the internal surface of the body 3.

In the embodiment shown, swiveling is obtained by providing an association zone that includes a projection 21 for centring and sealing the plunger 16 around the atomizer 9 and an annular space 22 enabling angular deflection of the atomizer 9 relative to the plunger 16. To be more precise, in the figures, the plunger 16 includes a bore which has an upper diameter defining the annular space 22 around the periphery of the atomizer 9, and a lower diameter forming a radial centring projection 21 which is in sealed contact around the periphery of the atomizer 9. In this embodiment, the plunger 16 includes a shaft 23 around the upper diameter, with the pre-tensioning spring 20 supported on the upper surface of said shaft. Alternatively and not shown, the geometry of the periphery of the atomizer 9 could be adapted to form the association zone that enables swiveling.

To enable swiveling in an adapted angular range, the ratio between the axial dimensions of the upper and lower diameters may be between 8 and 4.

The pump additionally includes an upper shroud 24 which is interposed between the atomizer 9 and the push button 10, said shroud providing local reinforcement for the atomizer 9, so that an atomizer 9 of reduced diameter can be implemented in the zones that are less acted upon mechanically. Furthermore, the periphery of the shroud 24 includes a surface for fitting 25 a bore of the push button 10, said surface being provided with an annular groove 26 into which a projection formed in the bore of the push button is inserted to make said fitting reliable.

The shroud 24 is fitted around the upper part of the atomizer 9 leaving an upper surface 27 of said atomizer free so that the push button 10 comes into axial support on said surface thereby forming a stop.

The pump shown also includes an expander 28 rigidly connected to the body 3 by sealed fitting inside said body, the plunger 16 being slidably mounted in the expander 28. The expander 28 is of cylindro-conical geometry including a lower bearing surface 29 in contact with the periphery of the plunger 16, and particularly in sealed contact with the periphery of the shaft 23, so as to guide said plunger while restricting the swiveling thereof relative to said body.

The return spring 11 is supported on the outside of the lower bearing surface 29. Furthermore, the periphery of the expander 28 includes a radial projection 30 which forms an axial stop of the expander 28 on a step formed in the body 3. Furthermore, an air vent 31 is formed in the body 3 underneath the zone in which the expander 28 is fitted.

To improve the guiding in translatory motion of the atomizer 9, the shroud 24 includes a lower skirt 32 which extends under the fitting surface 25 of the push button 10, said skirt having an external diameter that enables said skirt to slide without play in the expander 28 when the atomizer 9 is moved in translatory motion. Furthermore, this embodiment enables the angle of swivel of the atomizer 9 to be restricted. Furthermore, the presence of the skirt 32 masks the springs 11, 20 laterally when the pump is in the rest position.

Figure 2:
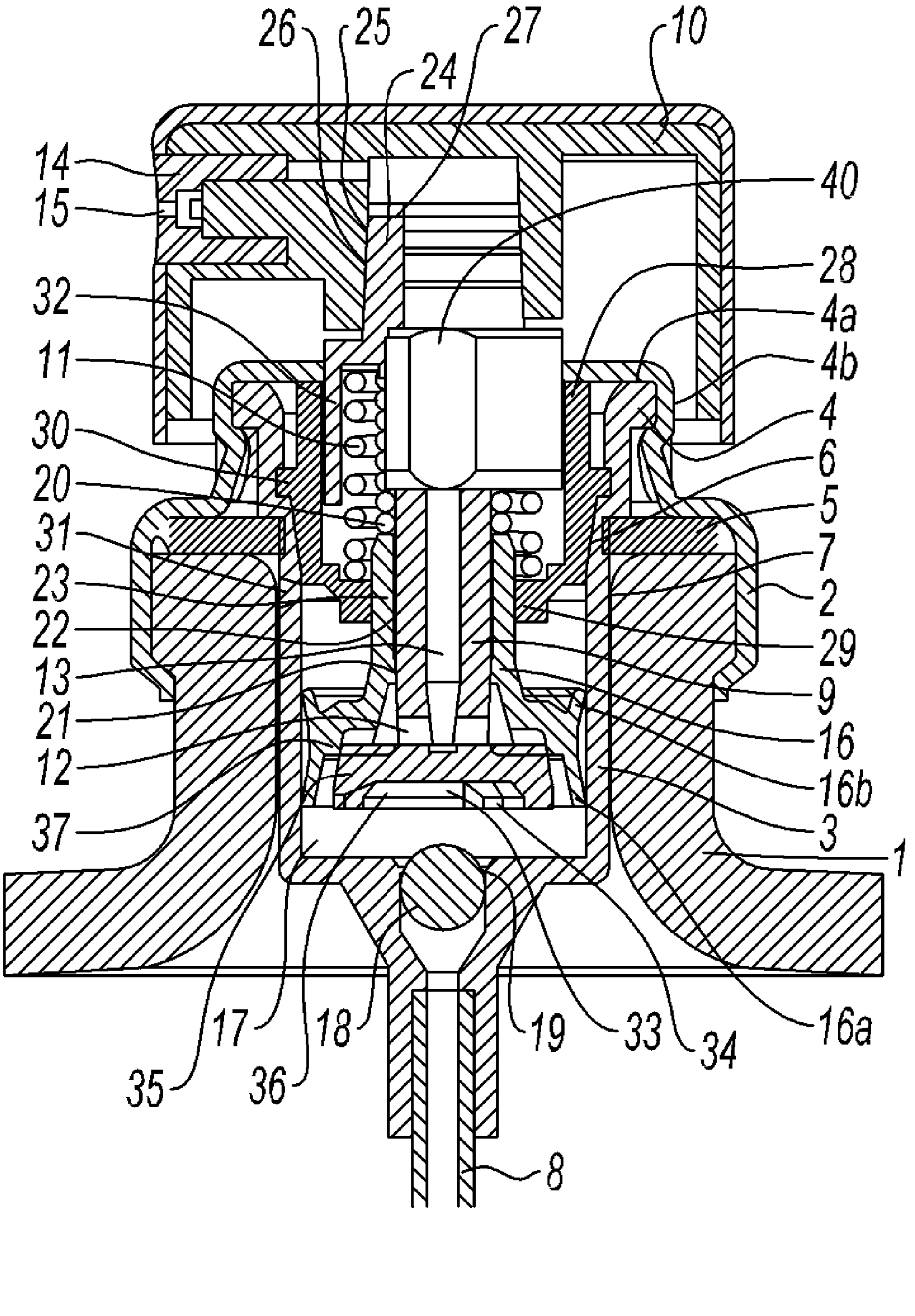
FIG. 2 is a view similar to FIG. 1*d* showing the skirt of the shroud partially not in cross-section.

As shown in FIG. 2, the skirt 32 has at least one hollow zone 40 emerging axially so as to enable air to pass between said skirt and the expander 28. Thus, the difference in pressure between the inside and outside of the expander 28 is limited so as not to interfere over the suction stroke of the atomizer 9.

The return spring 11 and the pre-tensioning spring 20 are placed concentrically, said return spring having the largest diameter. The springs 11, 20 are on one hand supported on the shroud 24 and on the other hand supported on the expander 28 and the plunger 16 respectively. This embodiment prevents the springs 11, 20 from being brought into contact with the fluid, and contributes to the axial compactness of the pump. Furthermore, since the springs 11, 20 are not visible in the pump, provision may be made for the body 3, the ball 18 and/or the dip tube 8 to be made out of a transparent or at least a translucent material so as to provide a particularly unobtrusive and esthetically satisfying pump. Furthermore, the compactness of the pump enables it to be accommodated in the collar 1, only the dip tube 8 extending inside the bottle.

The spring 11 is supported under the skirt 32, which means that a spring of significant diameter can be used so that the stresses exerted by said spring are able to contribute to the angular stability of the atomizer 9 relative to the body 3. Furthermore, the springs 11, 20 have inverted spirals to enable the push button 10 to rotate more easily in both directions around its axis.

The lower part of the atomizer 9 which is placed in the dosing chamber 17 is arranged so as to form a dead space volume 33 so as to limit the pump priming speed. However, to retain a constant dose, the dead space volume 33 is in communication with the dosing chamber by means of radial passages 34.

According to the embodiment shown, the lower part includes a ring 35 that has slots 36, said slots being arranged so as to define the end of stroke setting of the atomizer 9 as it comes to be supported on the lower wall of the dosing chamber 17 (FIG. 1*c*). The dead space volume 33 is thus defined under the ring 35 and the radial passages 34 are formed between the adjacent slots 36. Furthermore, the presence of the slots 36 means that, at stroke end, a suction pad effect of the ring 35 on the lower wall of the dosing chamber 17 is averted.

Furthermore, the ring 35 has a generator inclined externally relative to the axis of the atomizer 9 and the plunger 16 includes a sealing zone 37 which, in the blocked state, is in contact on the outer surface of the ring 35. Furthermore, the lower bearing surface 29 is arranged to engage with a complementary bearing surface of the plunger 16 so that, in the blocked state, the stress exerted by the return means 11 improves the seal of the dosing chamber 17 in said sealing zone in contact with the ring 35.

To be more precise, the outer surface of the complementary bearing surface has an annular surface which is inclined externally, and a radial annular surface. Thus, when pressure is applied to this surface, the sealing zone 37, which is provided on the opposite side, is pinned against the outer surface of the ring 35. This embodiment ensures that a seal is provided between the expander 28 and the plunger 16 and also improves the suction power of the pump.

What is claimed is:

1. Pump intended to be mounted on a bottle so as to enable a liquid contained in said bottle to be dispensed, said pump including:

a pump body intended to be rigidly connected to the bottle while able to be brought into communication with the liquid;

an atomizer secured to a push button so as to be activated in translatory motion in said body, said atomizer including a dispensing path including at least one upstream orifice and a channel whereof the downstream end is in communication with a dispensing nozzle;

a means for the elastic return of the translatory motion of said atomizer in said body;

a plunger mounted in frictional contact against the internal surface of said body so as to define a dosing chamber which is in communication with the liquid by means of a clack valve, said plunger being arranged so as to offer a state where the upstream orifices are blocked and a state where the upstream orifices are brought into communication with the dosing chamber;

said pump being characterised in that the plunger is mounted coaxially around the atomizer in an association zone, said association zone being arranged so as to enable sealed swiveling between the plunger and the atomizer;

wherein said association zone includes a projection for centering and sealing the plunger around the atomizer and an annular space enabling angular deflection of said atomizer relative to said plunger;

wherein said plunger includes an upper and a lower sealing lip, wherein each of said upper and said lower sealing lip are in frictional contact with an internal surface of said pump body, said upper sealing lip extending from an opposite side of said plunger than said lower sealing lip relative to a direction of translatory motion of said plunger;

wherein the association zone is arranged so as to enable a relative sliding of the plunger around the atomizer between the state where it is blocked and the state where it is brought into communication, said sliding being constrained by elastic pre-tensioning means mounted in support between the plunger and the atomizer;

wherein the pre-tensioning means is a spring;

wherein the return means is a spring having a diameter larger than a diameter of the pre-tensioning means and the return means is placed concentrically around the pre-tensioning means;

characterised in that it additionally includes an expander secured to the body, the plunger being slidably mounted in the expander, the return means being supported on the outside of a lower bearing surface of the expander;

characterised in that it additionally includes an upper shroud which is interposed between the atomizer and the push button; and characterised in that the shroud includes a lower skirt which has an external diameter that enables said skirt to slide without play in the expander when the atomizer is moved in translatory motion.

2. Pump according to claim 1, characterised in that the plunger includes a bore which has an upper diameter defining the annular space around the periphery of the atomizer, and a lower diameter forming a radial centering projection which is in sealed contact around the periphery of the atomizer.

3. Pump according to claim 2, characterised in that the ratio between the axial dimensions of the upper and lower diameters is between 8 and 4.

4. Pump according to claim 1, characterised in that the springs have inverted spirals.

5. Pump according to claim 1, characterised in that the lower bearing surface is arranged to engage with a complementary bearing surface of the plunger so that, in the blocked state of the plunger, the stress exerted by the return means improves the seal of the dosing chamber.

6. Pump according to claim 1, characterised in that the periphery of the skirt has at least one hollow zone emerging axially.

7. Pump intended to be mounted on a bottle so as to enable a liquid contained in said bottle to be dispensed, said pump including:

a pump body intended to be rigidly connected to the bottle while able to be brought into communication with the liquid;

an atomizer secured to a push button so as to be activated in translatory motion in said body, said atomizer including a dispensing path including at least one upstream orifice and a channel whereof the downstream end is in communication with a dispensing nozzle;

a means for the elastic return of the translatory motion of said atomizer in said body;

a plunger mounted in frictional contact against the internal surface of said body so as to define a dosing chamber which is in communication with the liquid by means of a clack valve, said plunger being arranged so as to offer a state where the upstream orifices are blocked and a state where said upstream orifices are brought into communication with the dosing chamber;

said pump being characterised in that the plunger is mounted coaxially around the atomizer in an association zone, said association zone being arranged so as to enable sealed swiveling between the plunger and the atomizer;

wherein said association zone includes a projection for centering and sealing the plunger around the atomizer and an annular space enabling angular deflection of said atomizer relative to said plunger;

wherein said plunger includes an upper and a lower sealing lip, wherein each of said upper and said lower sealing lip are in frictional contact with an internal surface of said pump body, said upper sealing lip extending from an opposite side of said plunger than said lower sealing lip relative to a direction of translatory motion of said plunger;

wherein the association zone is arranged so as to enable a relative sliding of the plunger around the atomizer between the state where it is blocked and the state where it is brought into communication, said sliding being constrained by elastic pre-tensioning means mounted in support between the plunger and the atomizer;

wherein the pre-tensioning means is a spring;

wherein the return means is a spring having a diameter larger than a diameter of the pre-tensioning means and the return means is placed concentrically around the pre-tensioning means;

characterised in that it additionally includes an upper shroud which is interposed between the atomizer and the push button; and characterised in that the return means and any pre-tensioning means are supported on the shroud.

8. Pump according to claim 1, characterised in that the shroud is fitted around an upper part of the atomizer, the push button being axially supported on the upper surface of the atomizer.

9. Pump according to claim 1, characterised in that the lower part of the atomizer which is placed in the dosing chamber is arranged to form a dead space volume.

10. Pump according to claim 9, characterised in that the dead space volume is in communication with the dosing chamber by means of radial passages.

11. Pump according to claim 10, characterised in that the lower part includes a ring that has slots, said slots being arranged so as to define the end of stroke setting of the atomizer as it comes to be supported on the lower wall of the dosing chamber.

12. Pump according to claim 11, characterised in that the ring has a generator inclined externally relative to the axis of the atomizer.

13. Pump according to claim 11, characterised in that the plunger includes a sealing zone which, in the blocked state, is in contact on the outer surface of the ring.

14. Pump according to claim 1, characterised in that the area of the body which is intended to enable the pump to be mounted onto the bottle includes an upper sealing bead and/or a lateral sealing bead, on which a cap for associating the pump with the bottle is intended to be supported in a sealed way.

* * * * *